US010155455B1

(12) United States Patent
Lin (10) Patent No.: US 10,155,455 B1
(45) Date of Patent: Dec. 18, 2018

(54) COMBINING STRUCTURE BETWEEN SEAT BODY AND SEAT CHASSIS OF CHAIR

(71) Applicant: Tung Yu O.A. Co., Ltd.

(72) Inventor: Yu-Hong Lin, Minhsiung Township (TW)

(73) Assignee: Tung Yu O.A. Co., Ltd., Minhsiung (TW)

( * ) Notice: Subject to any disclaimer, the term of this patent is extended or adjusted under 35 U.S.C. 154(b) by 0 days.

(21) Appl. No.: 15/622,129

(22) Filed: Jun. 14, 2017

(51) Int. Cl.
| | |
|---|---|
| *B60N 2/07* | (2006.01) |
| *B60N 2/06* | (2006.01) |
| *B60N 2/14* | (2006.01) |
| *B60N 2/68* | (2006.01) |
| *B60N 2/015* | (2006.01) |
| *B60N 2/50* | (2006.01) |
| *B60N 2/54* | (2006.01) |
| *B60N 2/90* | (2018.01) |
| *A47C 4/02* | (2006.01) |

(52) U.S. Cl.
CPC .......... *B60N 2/0702* (2013.01); *B60N 2/015* (2013.01); *B60N 2/06* (2013.01); *B60N 2/14* (2013.01); *B60N 2/502* (2013.01); *B60N 2/544* (2013.01); *B60N 2/682* (2013.01); *B60N 2/933* (2018.02); *A47C 4/02* (2013.01); *A47C 4/028* (2013.01); *B60N 2/07* (2013.01)

(58) Field of Classification Search
CPC ........ B60N 2/0702; B60N 2/933; A47C 4/02; A47C 4/028
USPC ........ 297/344.1, 440.2, 311, 344.12, 440.15, 297/344.13, 440.14
See application file for complete search history.

(56) References Cited

U.S. PATENT DOCUMENTS

| | | | | | |
|---|---|---|---|---|---|
| 6,139,103 | A | * | 10/2000 | Hybarger ........... | A47C 1/03238 297/300.2 |
| 6,276,755 | B1 | * | 8/2001 | Su ...................... | A47C 1/03255 297/285 |
| 6,523,897 | B2 | * | 2/2003 | Pan ........................ | A47C 1/022 297/300.2 |
| 6,588,843 | B1 | * | 7/2003 | Ebenstein .......... | A47C 1/03238 297/300.1 |
| 6,644,749 | B2 | * | 11/2003 | VanDeRiet ........ | A47C 1/03272 297/239 |

(Continued)

FOREIGN PATENT DOCUMENTS

| | | |
|---|---|---|
| TW | M297674 U | 9/2006 |
| TW | M321261 U | 11/2007 |

(Continued)

*Primary Examiner* — Syed A Islam
(74) *Attorney, Agent, or Firm* — Alan D. Kamrath; Kamrath IP Lawfirm, P.A.

(57) ABSTRACT

A seat body is assembled with a seat chassis device that has a seat chassis mounted on the seat body. The seat body has an accommodating space and guiding troughs each having a guiding opening. The accommodating space includes a propping portion to be resiliently flattened. The seat chassis device has a base connected thereto and is formed with sliding wedge portions to slide into the guiding troughs from the guiding openings. When the seat chassis slides to a predetermined position, the propping portion springs up and abuts against the seat chassis. A spring between the base and the seat chassis is upward pushed by a resilience-adjusting unit and has its upper end received in a dome raised from the seat chassis and received in a hollow portion of the seat body.

2 Claims, 7 Drawing Sheets

(56) References Cited

U.S. PATENT DOCUMENTS

| | | | | |
|---|---|---|---|---|
| 7,159,942 B2* | 1/2007 | Costaglia | ............... | A47C 1/023 |
| | | | | 297/311 |
| 7,172,250 B2* | 2/2007 | Wu | ................ | A47C 1/023 |
| | | | | 297/337 |
| 8,985,688 B2* | 3/2015 | Gorgi | ................ | A47C 1/03238 |
| | | | | 297/303.2 |
| 2013/0049422 A1* | 2/2013 | Chou | ................ | A47C 7/004 |
| | | | | 297/344.12 |

FOREIGN PATENT DOCUMENTS

| | | |
|---|---|---|
| TW | M348541 U | 1/2009 |
| TW | M385976 U | 8/2010 |
| TW | M391887 U | 11/2010 |
| TW | M405801 U | 6/2011 |
| TW | M452691 U | 5/2013 |
| TW | I429411 B | 3/2014 |
| TW | M493934 U | 1/2015 |
| TW | M530079 U | 10/2016 |

* cited by examiner

COMBINING STRUCTURE BETWEEN SEAT BODY AND SEAT CHASSIS OF CHAIR

BACKGROUND OF THE INVENTION

1. Technical Field

The present invention relates to a combination between a seat chassis and a seat body of a seat chassis device. The seat body is provided with guiding troughs, and the seat chassis has sliding wedge portions configured to slide into the guiding troughs and be prevented from reversely sliding out, thereby making assembling the seat chassis and seat body easier.

2. Description of Related Art

A typical office chair has a seat body for a person to sit on combined with a seat chassis device that is further connected to a chair leg assembly. The seat chassis device is equipped with features for allowing adjustment of the backrest in terms of tilt angle, resilient support level, and seat body's position. The seat chassis device also comprises a seat chassis at its top to be combined with the bottom of the seat body. The seat chassis is pivotally connected from below by a base that is connected to the chair leg assembly. Furthermore, between the seat chassis and the base, there are a resilience-adjusting unit for adjusting the backrest's resilient force and components for forward and backward adjustment of the seat body, to allow adjustment of the backrest's tilt angle, the backrest's resilient force, and the seat body's relative position.

However, the seat chassis of such a known seat chassis unit is typically screwed to the seat body by screws. Thus, the seat body has to be preinstalled with nuts having threaded holes for the screws to combine. Besides, since a screwing operation is known to be time- and effort-consuming, the overall assembling operation is less efficient.

In addition, the seat body is assembled to the bottom of the seat chassis device. With all the components for other operational functions installed, the appearance is uneven and untidy. Also, the resilience-adjusting unit in the seat chassis device typically works upon its spring for control and adjustment. The spring may be, in terms of orientation, a vertical one (such as any disclosed in Taiwan Patents 1429411, M452691, M405801, and M297674) or a horizontal one (such as any disclosed in Taiwan Patents M530079, M493934, M385976, and M321261). The horizontal installation is intended to allow all the components (including the spring) of the resilience-adjusting unit to be received within the seat chassis device. However, this design unavoidably makes the spring, in terms of type and size, limited to the space in the seat chassis device. Consequently, the resilient support is limited. Since weak resilient support can make a person sitting on the chair feel unsafe, there are designs using two springs at the cost of structurally complicating the resilience-adjusting unit. On the other hand, the vertical installation needs only one spring to provide comfortable and reliable resilient support. However, the spring is unable to be contained by the seat chassis device, and its protruding out of the base makes the appearance of the bottom of the seat body unpleasant.

Besides, for making a chair more adjustable, there are designs that allow independent positionally forward and backward adjustment of the cushion, such as those disclosed in Taiwan Patents M391887 and M348541. These known designs involve installing additional adjustable control between the seat chassis device and the seat body, and thus make the chair's adjustment structure and in turn the assembling operation more complicated.

BRIEF SUMMARY OF THE INVENTION

Hence, for addressing the problems of the prior art devices about a difficult combination between the seat chassis device and the seat body, the odd look of the seat chassis at the resilience-adjusting unit of the seat body due to the vertical spring, and additional parts and mechanism required for forward and backward adjustment of the seat body, the present invention provides a combining structure where its seat body has guiding troughs for front and back sliding wedge portions at a seat chassis of a seat chassis device to slide in and engage with them. Continuous positioning teeth and an extendable positioning claw are correspondingly arranged between the seat body and the seat chassis to engage with each other, so that forward and backward adjustment of the seat body can be accomplished. The seat chassis of the seat chassis device has a raised dome positionally corresponding to the resilience-adjusting unit for receiving an upright spring. The seat body has a hollow portion for receiving the dome. With the aforementioned configurations, the disclosed structure allows the seat body to be adjusted forward and backward without complicated components, and since the resilience-adjusting unit can be tightly assembled with the seat chassis device, making combination between the seat chassis device and the seat body easy and fast.

For achieving this, the present invention implements the following technical scheme: providing a combining structure between a seat body and a seat chassis of chair. The seat body has its bottom assembled with a seat chassis device that is connected to a chair leg assembly, and the seat chassis device has its top surface provided with the seat chassis that is mounted on the seat body. The seat body has its bottom depressedly formed with an accommodating space. The accommodating space has its two opposite laterals each formed with front and back L-shaped guiding troughs each having a guiding opening, and the accommodating space has its bottom provided with a propping portion that is raised from the bottom and is configured to be resiliently flattened. The seat chassis device has a base pivotally connected thereto from below for connecting the chair leg assembly. The seat chassis has its two opposite laterals each formed with front and back sliding wedge portions configured to slide into the front and back L-shaped guiding troughs from the guiding opening. Thus, when the seat chassis slides to a predetermined position, the propping portion provided in the accommodating space of the seat body springs up and abuts against a front end of the seat chassis. A spring is loaded between a back end of the base and the seat chassis with its lower end settled on the base through a resilience-adjusting unit that upward pushes the spring. The spring has its upper end received in a dome raised from the seat chassis, and the seat body has a hollow portion positionally corresponding to and for receiving the dome.

In the foregoing scheme, the seat chassis has its top surface provided with continuous positioning teeth, and the seat body is provided with an extendable positioning claw positionally corresponding to the positioning teeth. Thus, when the seat body slides to the predetermined position along the front and back guiding troughs, the positioning claw engages with the corresponding positioning teeth.

The present invention thus has some beneficial effects. With the sliding combination between the front and back guiding troughs at the bottom of the foregoing seat body and the front and back sliding wedge portions at the top surface of the seat chassis device, the assembling operation is easy. Also, the positioning mechanism between the seat body and the seat chassis device allows the seat body to be adjusted forward and backward. In addition, the dome on the seat chassis of the seat chassis device and the corresponding hollow portion of the seat body make it possible that the resilience-adjusting unit and its upright spring for providing the chair's backrest with resilient support are both received within the seat chassis device, thereby streamlining the overall look of the chair.

DETAILED DESCRIPTION OF THE INVENTION

Figure 1:
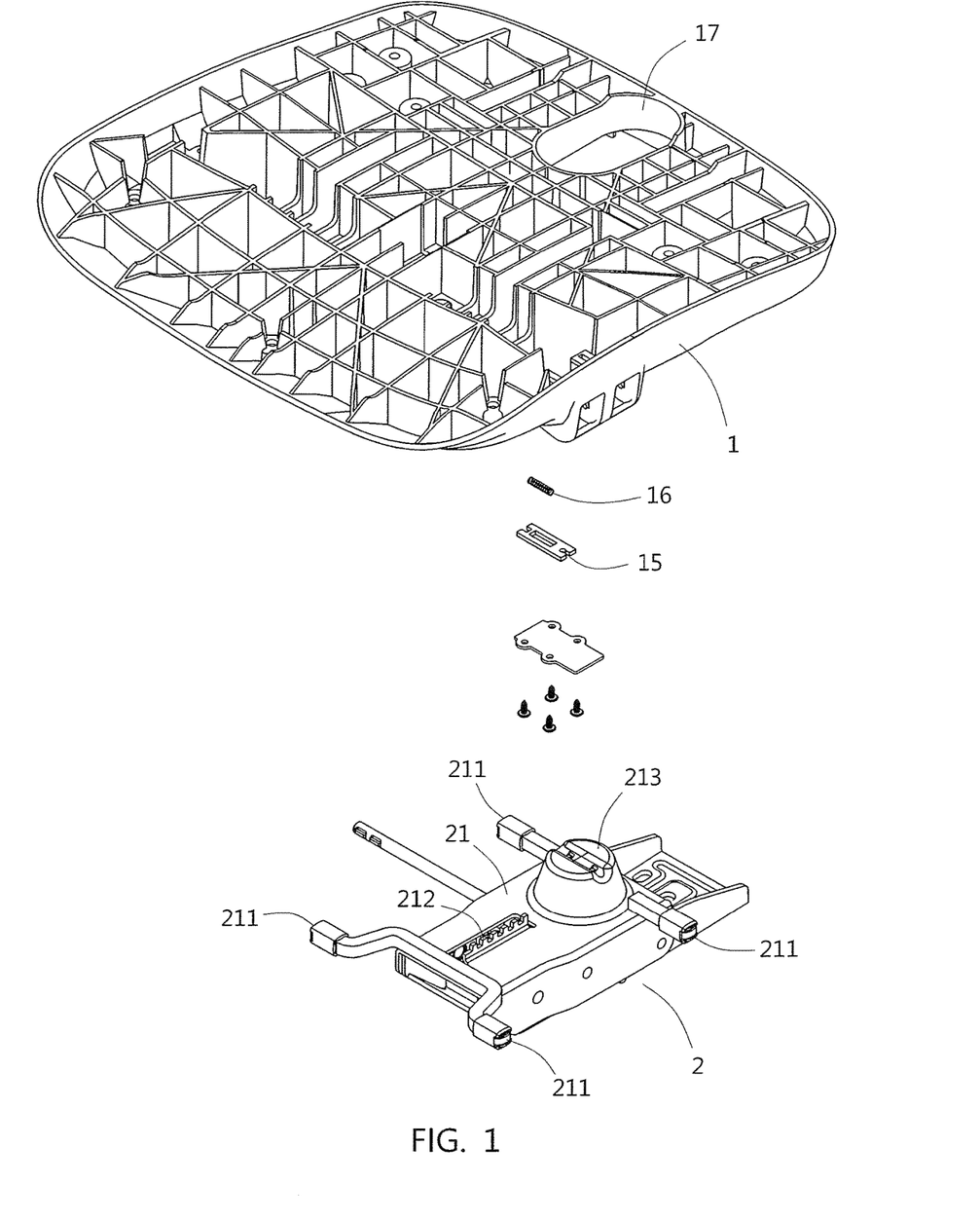
FIG. 1 is a top exploded view of a seat body and a seat chassis device according to the present invention.
Figure 2:
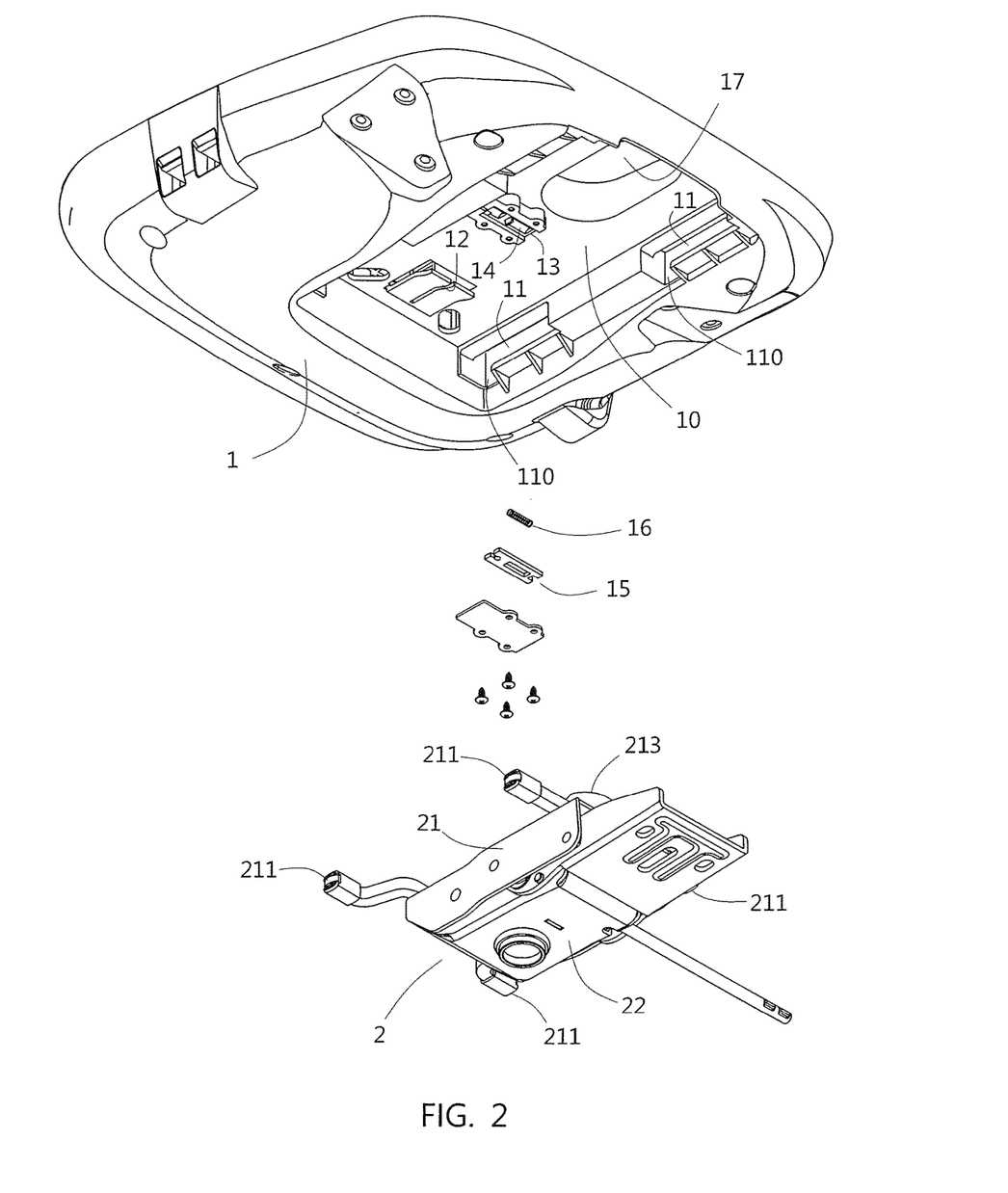
FIG. 2 is a bottom exploded view of the seat body and the seat chassis device according to the present invention.

Referring to FIG. 1 and FIG. 2, according to the present invention, a seat body 1 carries a cushion has its bottom mounted on a seat chassis device 2 that is further combined with a chair leg assembly. The seat chassis device 2 primarily comprises a top surface provided with a seat chassis 21. A base 22 is pivotally connected to the seat chassis 21 from below. The seat chassis 21 has its two laterals each formed with front and back sliding wedge portions 211. The seat chassis 21 has its top surface provided with continuous positioning teeth 212 at its center near its front end, and formed with a raised portion near its back end. The raised portion defines a dome 213 therein.

Figure 3:
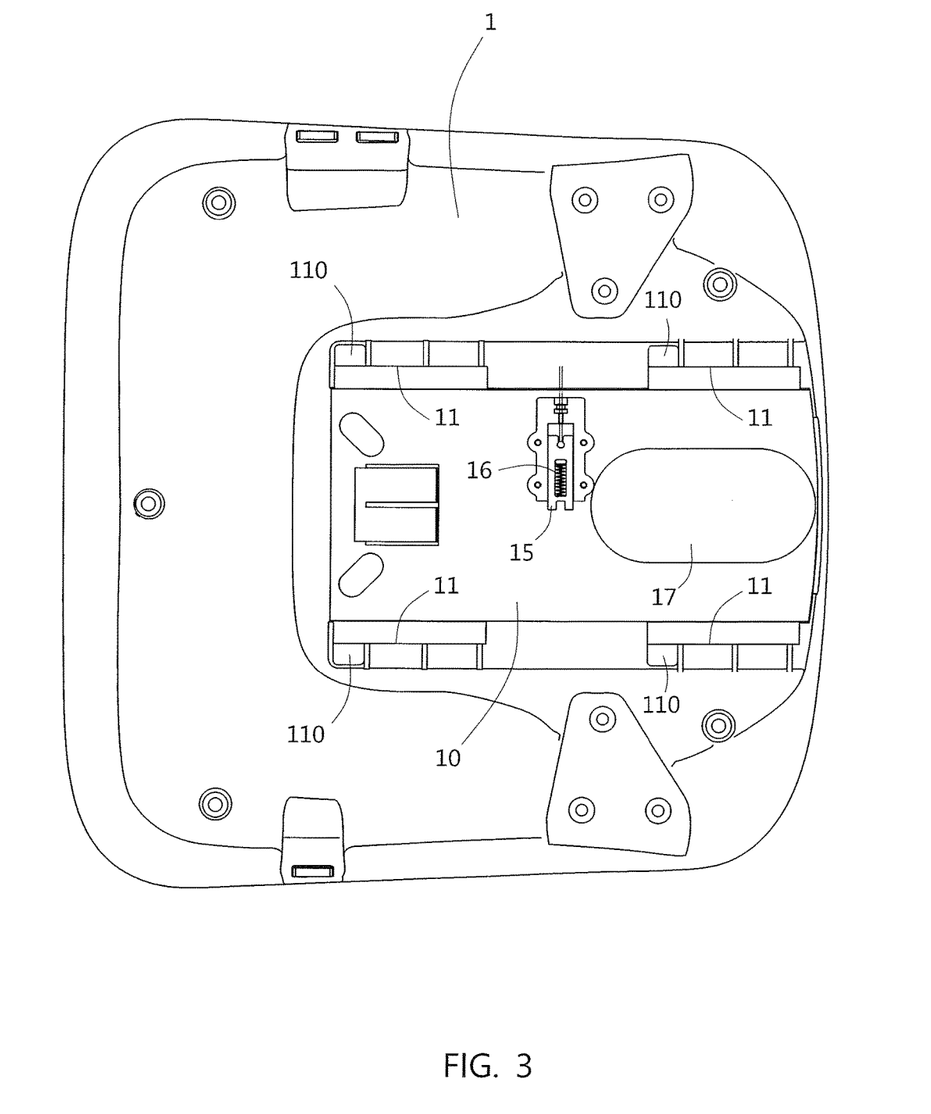
FIG. 3 is a front schematic view of the present invention showing the seat body's bottom positioning device.

In addition, the foregoing seat body 1 has its bottom depressedly formed with an accommodating space 10 for receiving the seat chassis device 2. The accommodating space 10 has its two opposite laterals each formed with front and back L-shaped guiding troughs 11. Each of the L-shaped guiding troughs 11 has its one end formed with a guiding opening 110. The accommodating space 10 has its bottom provided with a propping portion 12 at its center near its front edge. The propping portion 12 is raised from the bottom and is configured to be resiliently flattened. Also referring to FIG. 3, the accommodating space 10 further has its bottom depressedly formed with a sliding track 13 that has a fixed cover. The sliding track 13 has a receiving recess 14 for receiving a spring 16. A positioning claw 15 is slidably installed in the sliding track 13, so that the positioning claw 15 is perfectly aligned with the continuous positioning teeth 212 on the seat chassis 21. The spring 16 has its back end abutting against the receiving recess 14, and has its front end abutting against the positioning claw 15. Thereby, the positioning claw 15 can slide along the sliding track 13 in response to a pulling force from a user-operated control cord, in turn achieving control of engagement and disengagement between the positioning claw 15 and the positioning teeth 212.

Figure 4:
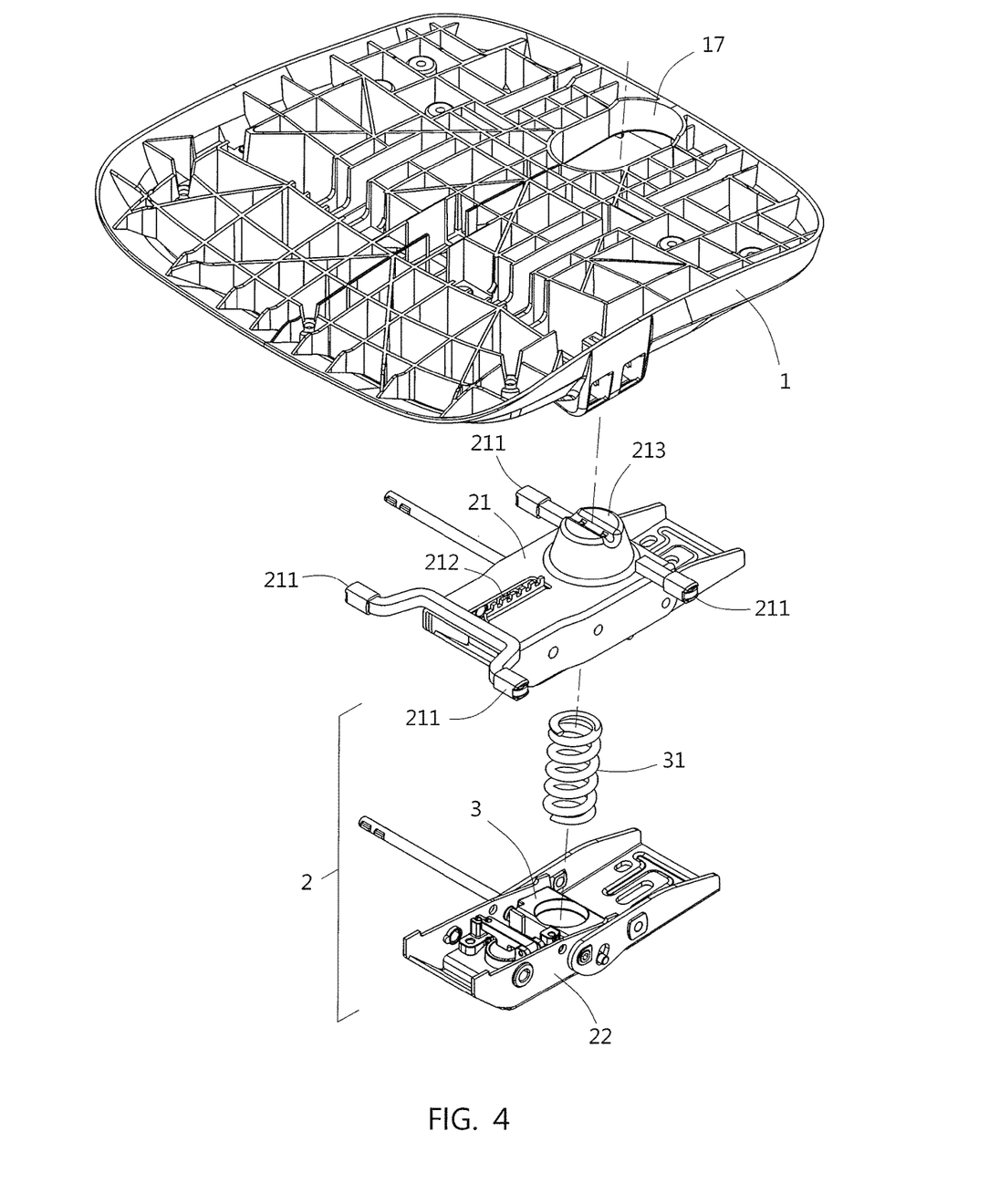
FIG. 4 is an exploded view of the present invention showing the seat chassis device and the seat body.

Referring also to FIG. 4, a resilience-adjusting unit 3 may be installed between the seat chassis 21 and the base 22 of the seat chassis device 2 for adjusting resilient support from the chair's backrest. The resilience-adjusting unit 3 comprises a spring 31 settled on the base 22 with the upper end of the spring 31 received in the dome 213 at the back end of the seat chassis 21. The seat body 1 has a hollow portion 17 positionally corresponding to the dome 213, so that the dome 213 raised from the adjacent seat chassis 21 is movably received in the hollow portion 17.

Figure 5:
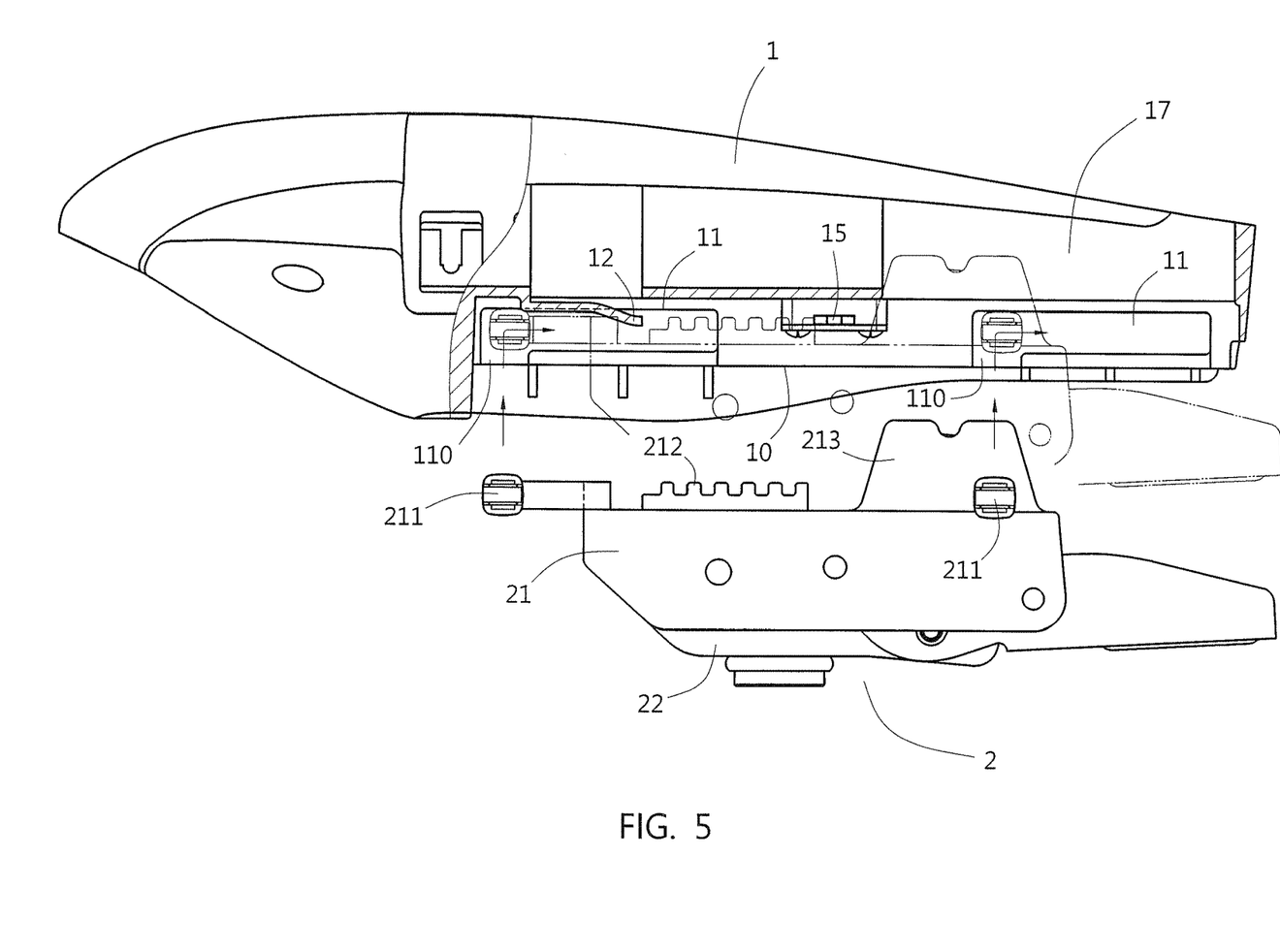
FIG. 5 is a lateral schematic view of the present invention illustrating how the seat chassis device is assembled with the seat body.
Figure 6:
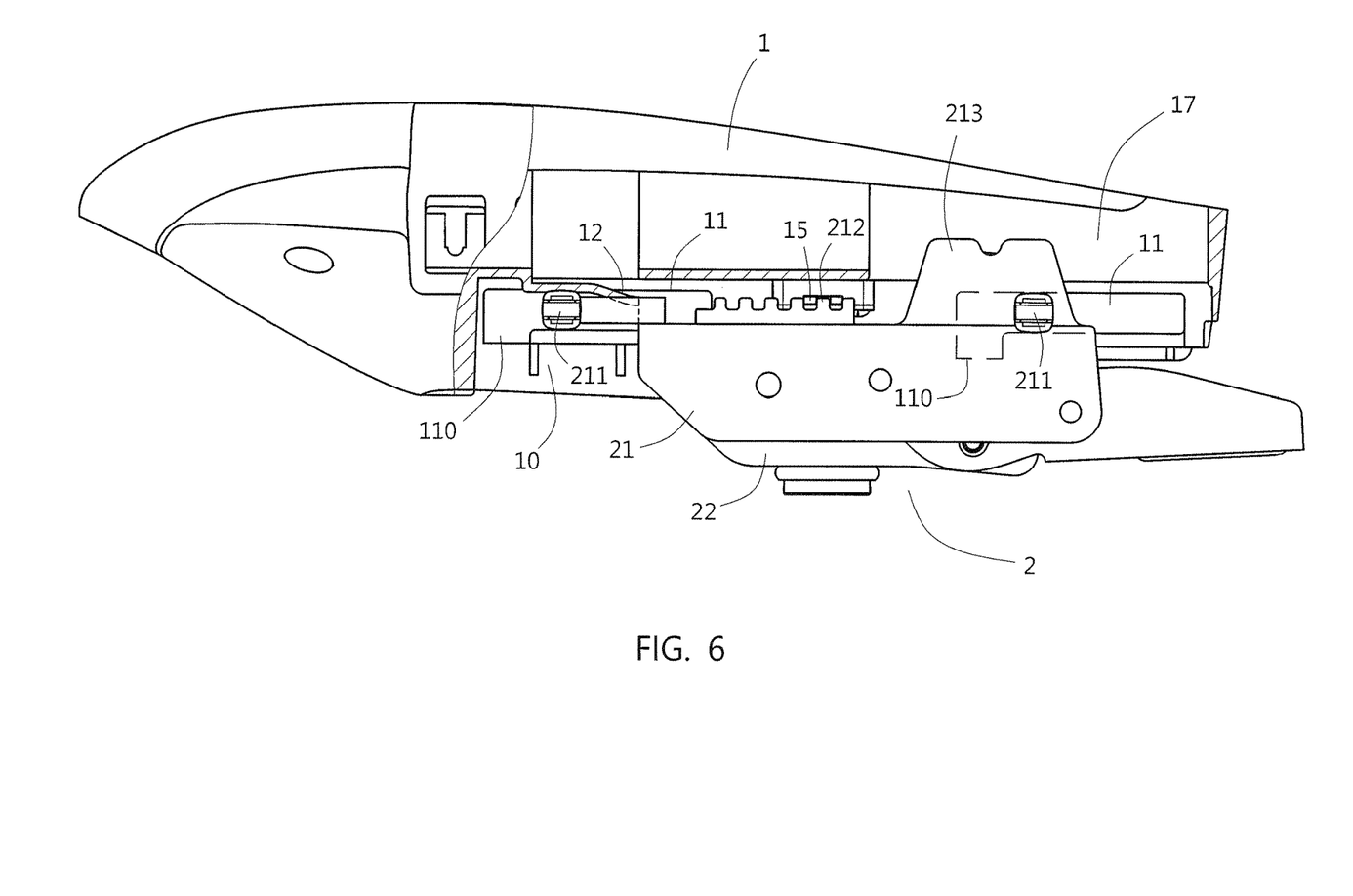
FIG. 6 is a lateral schematic view of the present invention showing the seat chassis device assembled with the seat body.

Thus, as shown in FIGS. 5 and 6, the seat chassis device 2 is installed into the accommodating space 10 from the lower part of the seat body 1. Then, the back sliding wedge portions 211 at front and back parts of the seat chassis 21 slide into the guiding troughs 11 through the guiding openings 110. Afterward, the seat chassis device 2 slides backward along the front and back L-shaped guiding troughs 11. After the propping portion 12 is pressed and flattened by the seat chassis 21 and resiliently returns to its normal position, the seat chassis device 2 (i.e. the seat chassis 21) is retained at its front end by the propping portion 12 and is prevented from slipping away from the guiding opening 110 of the L-shaped guiding trough 11. The seat chassis device 2 is allowed to slide in the L-shaped guiding trough 11, which means the seat body 1 is allowed to slide to and fro.

Figure 7:
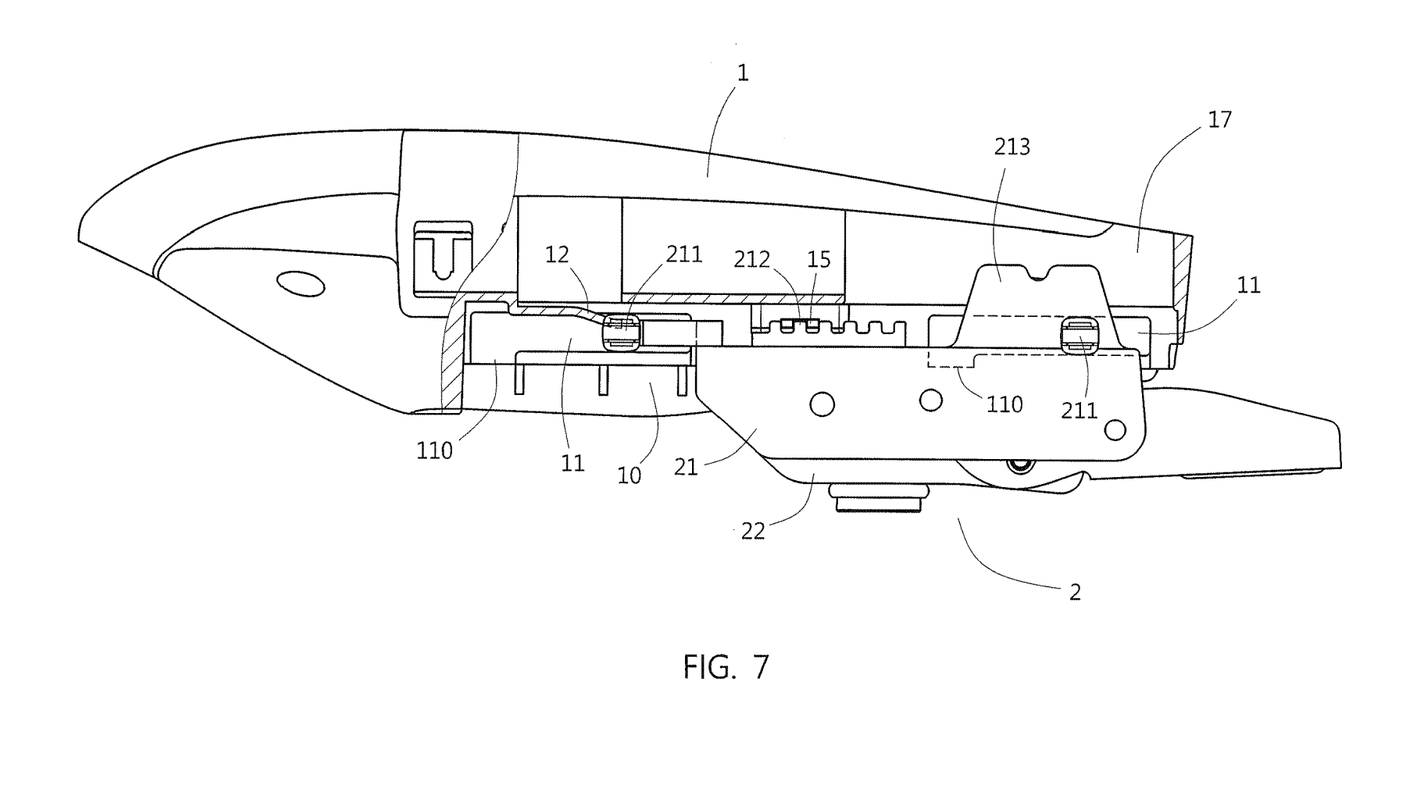
FIG. 7 is a schematic view illustrating sliding adjustment and positioning of the seat body according to the present invention.

Meanwhile, the extendable positioning claw 15 installed in the accommodating space 10 of the seat body 1 can correspondingly engage with and disengage from the continuous positioning teeth 212 on the seat chassis 21 of the seat chassis device 2.

Thus, the back sliding wedge portions 211 at the two sides of the seat chassis 21 of the seat chassis device 2 can easily slide into the L-shaped guiding troughs 11 at the right and left laterals of the accommodating space 10 depressedly formed on the bottom of the seat body 1 for convenient assembling operation. Moreover, the combination between the positioning claw 15 installed in the accommodating space 10 and the continuous positioning teeth 212 correspondingly provided on the seat chassis 21 allows the seat body 1 to be adjusted to and fro in a sliding manner without using any additional slide-guiding components. Furthermore, the hollow portion 17 at the back end of the seat body 1 receives the raised dome 213 of the seat chassis 21 of the seat chassis device 2, so the spring 31 of the resilience-adjusting unit 3 can stand upright in the seat chassis device 2. With these configurations, only a single spring 31 is sufficient to provide a proper resilient force, so the resilience-adjusting unit 3 can be structurally kept simple.

What is claimed is:

1. A combining structure comprising a seat body and a seat chassis of a chair, wherein the seat body has a bottom assembled with a seat chassis device that is connected to a chair leg assembly, wherein the seat chassis device has a top surface provided with the seat chassis that is mounted on the seat body, with:

the seat body having a bottom depressedly formed with an accommodating space, the accommodating space having two opposite laterals formed with front and back L-shaped guiding troughs each having a guiding opening, and the accommodating space having a bottom provided with a propping portion that is raised from the bottom and is configured to be resiliently flattened;

the seat chassis device having a base pivotally connected thereto from below for connecting the chair leg assembly, the seat chassis having two opposite laterals formed with front and back sliding wedge portions configured to slide into the front and back L-shaped guiding troughs from the guiding openings, wherein when the seat chassis slides to a predetermined position, the propping portion provided in the accommodating space of the seat body springs up and abuts against a front end of the seat chassis; and a spring being loaded between a back end of the base and the seat chassis with a lower end settled on the base through a resilience-adjusting unit that upward pushes the spring, the spring having a upper end received in a dome raised from the seat chassis, and the seat body having a hollow portion positionally corresponding to and for receiving the dome.

2. The combining structure of claim 1, wherein the seat chassis has a top surface provided with continuous positioning teeth, wherein the seat body is provided with an extendable positioning claw positionally corresponding to the continuous positioning teeth, and wherein when the seat body slides to the predetermined position along the front and back L-shaped guiding troughs, the extendable positioning claw engages with corresponding positioning teeth of the continuous positioning teeth, allowing the seat body to be adjusted in a forward- and backward direction.

* * * * *